United States Patent [19]

Liu

[11] Patent Number: 5,586,810

[45] Date of Patent: Dec. 24, 1996

[54] ADJUSTABLE HEADREST

[76] Inventor: Yang-Ting Liu, P.O. Box 82-144, Taipei, Taiwan

[21] Appl. No.: 599,847

[22] Filed: Feb. 12, 1996

[51] Int. Cl.[6] .................................................... H47C 7/36
[52] U.S. Cl. ........................ 297/406; 297/410; 128/845
[58] Field of Search ................................ 297/391, 406, 297/407, 410; 5/636, 637; 269/111, 166, 296, 299, 239, 203; 128/845, 857, 870

[56] References Cited

U.S. PATENT DOCUMENTS

| | | | |
|---|---|---|---|
| 3,764,180 | 10/1973 | Muholland | 297/410 |
| 4,640,275 | 2/1987 | Buzzese et al. | 128/845 |
| 4,793,652 | 12/1988 | Hannah et al. | 297/410 |
| 5,308,028 | 5/1994 | Kornberg | 297/406 |

FOREIGN PATENT DOCUMENTS

| | | | |
|---|---|---|---|
| 0587441 | 4/1925 | France | 297/407 |

Primary Examiner—Peter M. Cuomo
Assistant Examiner—Anthony D. Barfield
Attorney, Agent, or Firm—Alfred Lei

[57] ABSTRACT

A headrest including two vertical rods, an upper horizontal rod, a lower horizontal rod, a pair of vertical supporting means arranged between the upper and lower horizontal rods and including a positioning rod and a guiding rod, a first pair of sliders slidably mounted on the upper horizontal rod, a second pair of sliders slidably mounted on the lower horizontal rod, a first pair of cylindrical members fitted in the first pair of sliders, a second pair of cylindrical members fitted in the second pair of sliders, a pair of panels slidably mounted the guiding rod, and a pair of cylinders fitted in the panels, whereby the headrest can be conveniently adjusted as desired.

2 Claims, 6 Drawing Sheets

5,586,810

ADJUSTABLE HEADREST

BACKGROUND OF THE INVENTION

1. Field of the Invention

This invention relates to a headrest and in particular to one which is adjustable in position.

2. Description of the Prior Art

It has been found that numerous kinds of headrests have been developed and placed at the market. However, none of them is satisfactory in use. FIG. 1 illustrates a typical headrest commonly sold on the market. As shown, the headrest includes a rectangular frame 10 composed of two upright rods 12 and two transverse rods 11. Two resting rods 20 are slidably mounted on the upper transverse rod 11 and utilize a screw 201 to keep at a fixed position. The lower portion of the upright rod 12 is inserted into a seat 13 and kept in place by a screw 13. However, such a headrest is uncomfortable to use and cannot be folded when not in use. FIG. 2 illustrates another prior art headrest sold on the market. The second prior art headrest is basically similar to the headrest shown in FIG. 1. As shown, a positioning rod 14 is mounted under the upper transverse rod 11 and provided with a plurality of teeth 141 at its front side. A slider 21 including a seat 215 is slidably mounted on the upper transverse rod 11 and provided with a supporting rod 214. A cushion 212 is fixedly arranged on an inner side of the supporting rod 214. Between the supporting rod 214 and the seat 215 there is a rotating structure 211. The supporting rod 214 has a protuberance 2141 at the rear end. A locking pin 213 is inserted between two teeth 141 to prevent the supporting rod 214 from moving outward. Nevertheless, this headrest is too complicated in structure and difficult in operation hence making it unsatisfactory in use.

Therefore, it is an object of the present invention to provide an improved headrest which can obviate and mitigate the above-mentioned drawbacks.

SUMMARY OF THE INVENTION

This invention relates to an adjustable headrest.

It is the primary object of the present invention to provide an adjustable headrest which is simple and sturdy in construction.

It is another object of the present invention to provide an adjustable headrest which is low in cost.

It is still another object of the present invention to provide an adjustable headrest which is facile to operate.

It is still another object of the present invention to provide an adjustable headrest which is comfortable to use.

It is a further-object of the present invention to provide an adjustable headrest which can be easily assembled.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
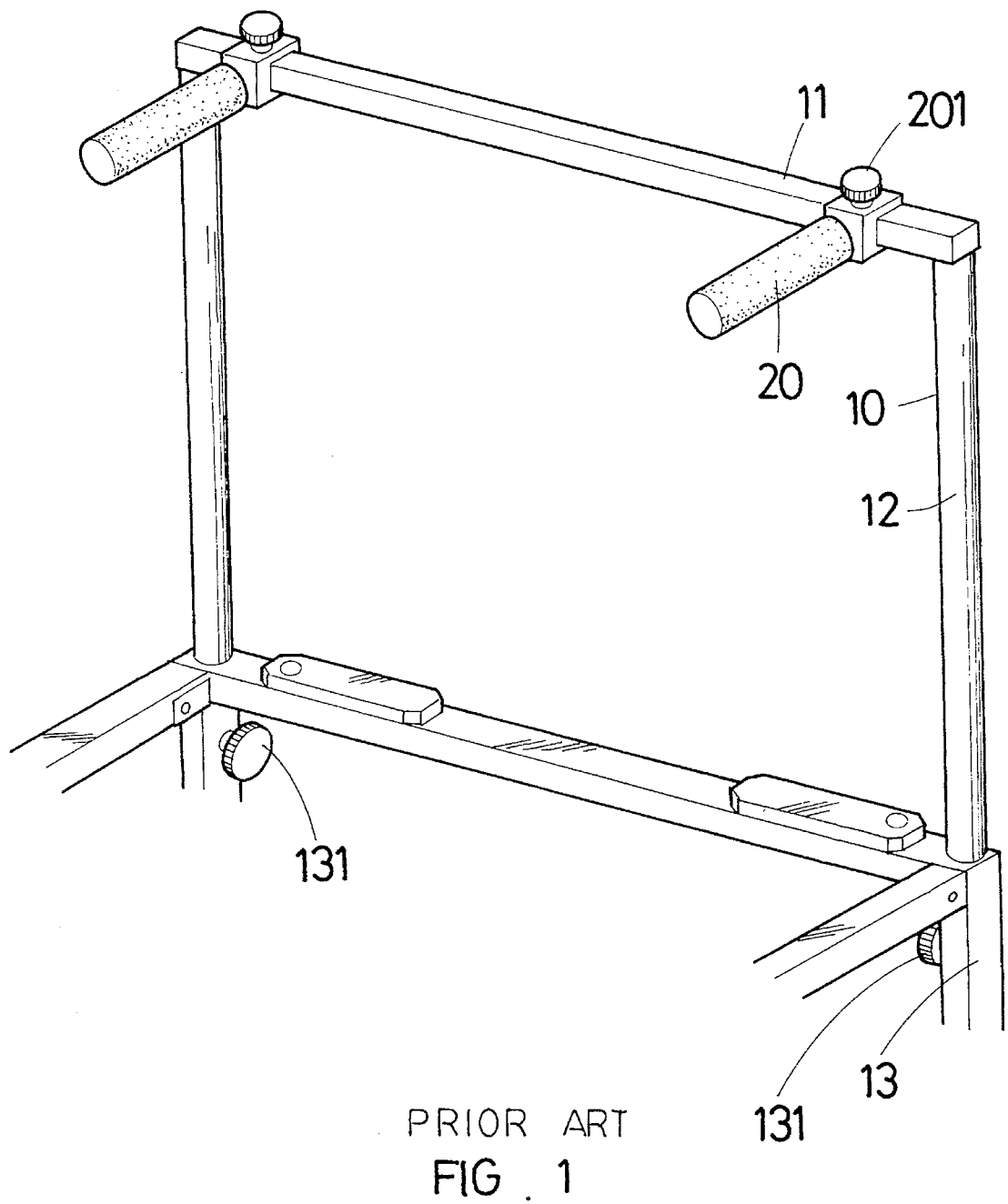
FIG. 1 illustrates the structure of a first prior art headrest.
Figure 2:
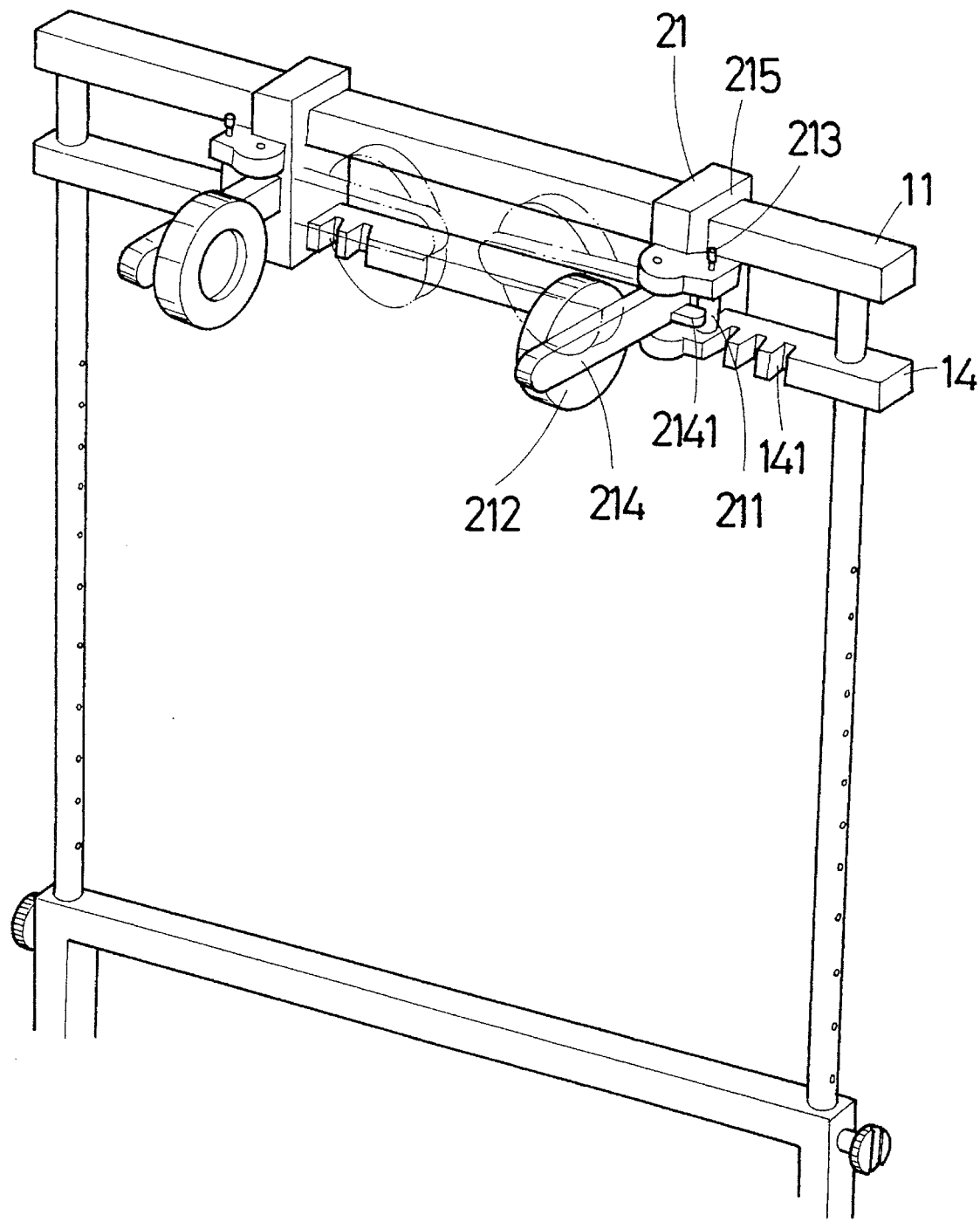
FIG. 2 illustrates the structure of a second prior art headrest.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 3:
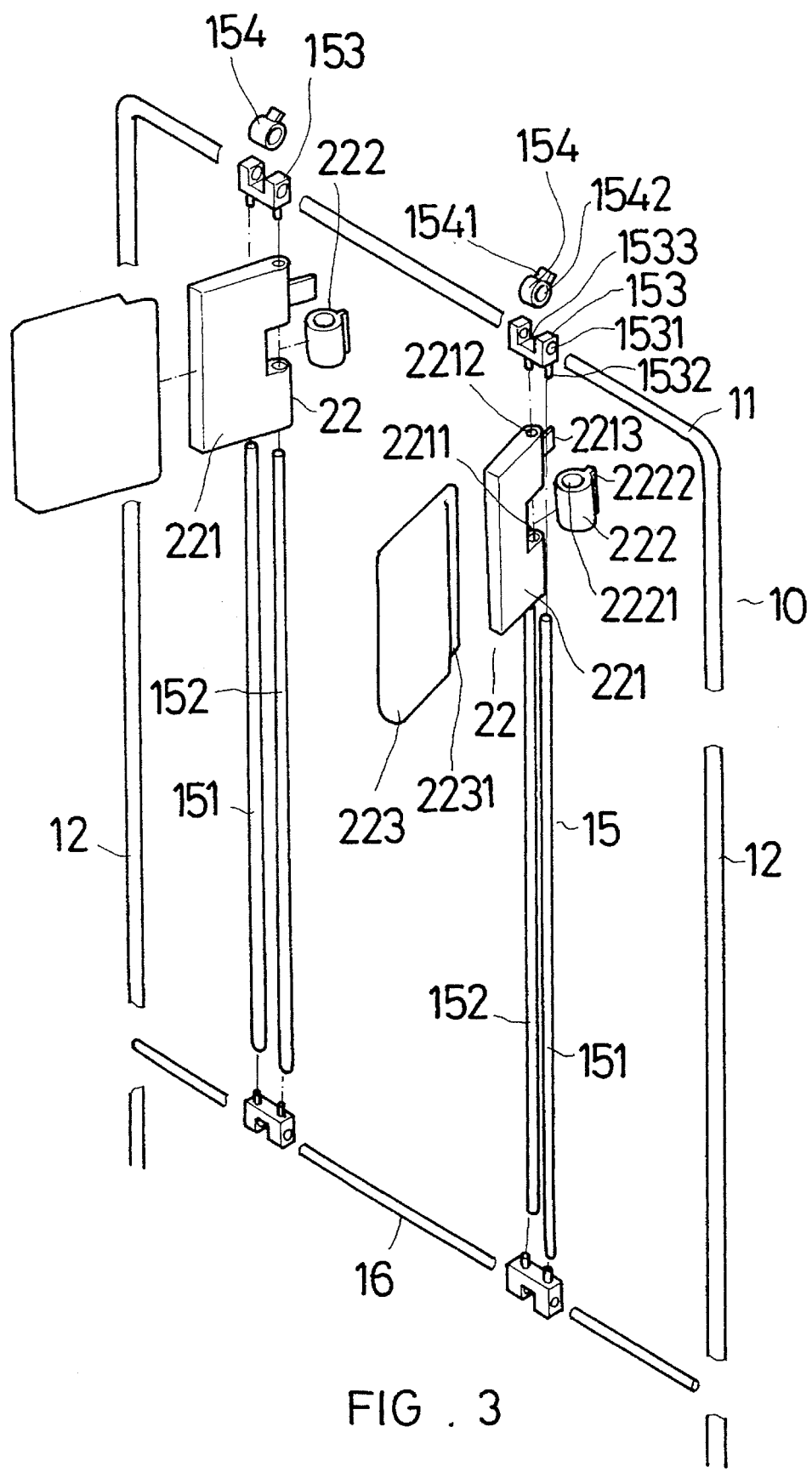
FIG. 3 is an exploded view of a headrest according to the present invention.
Figure 4:
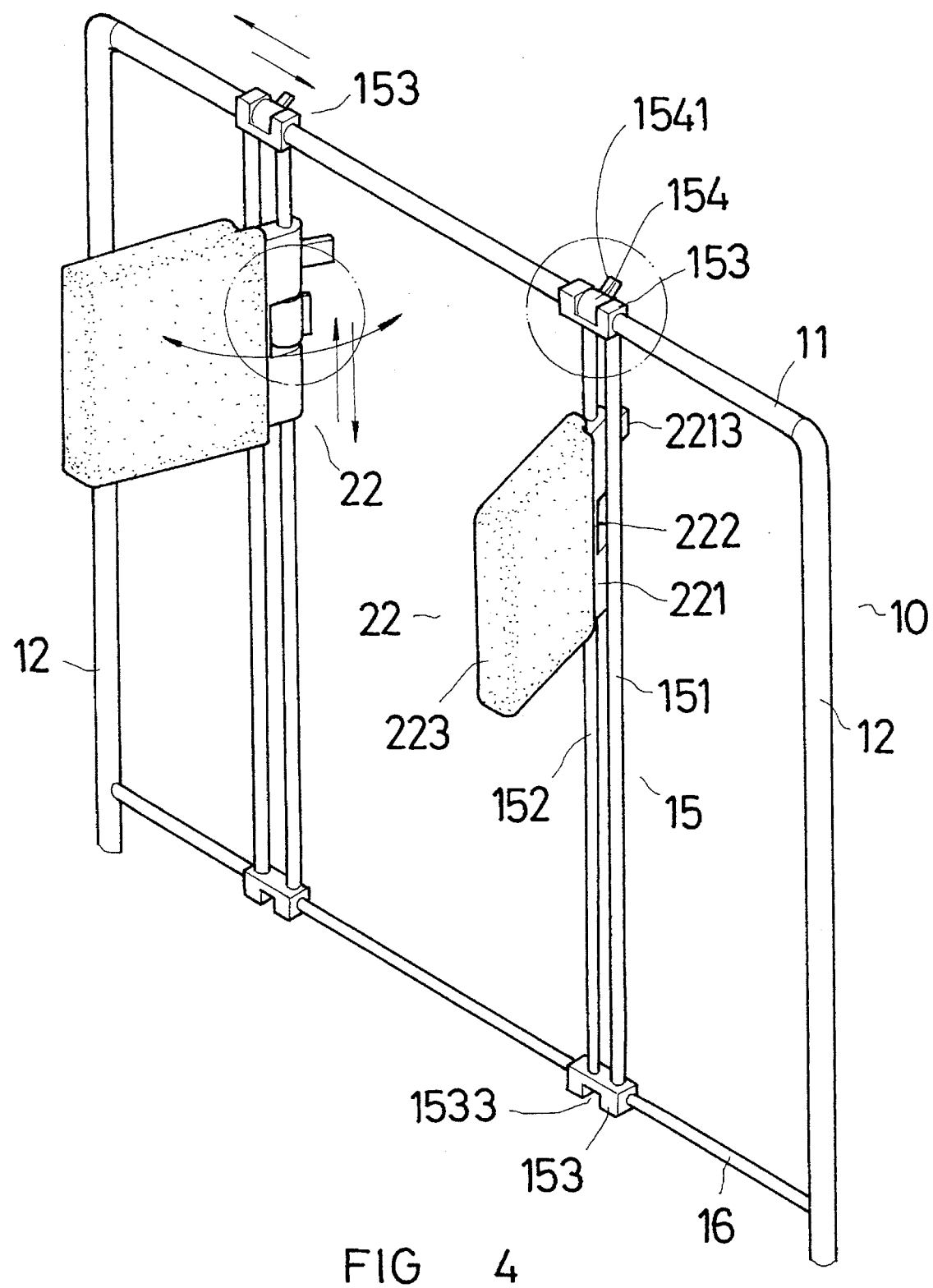
FIG. 4 is a perspective view of the present invention.
Figure 5:
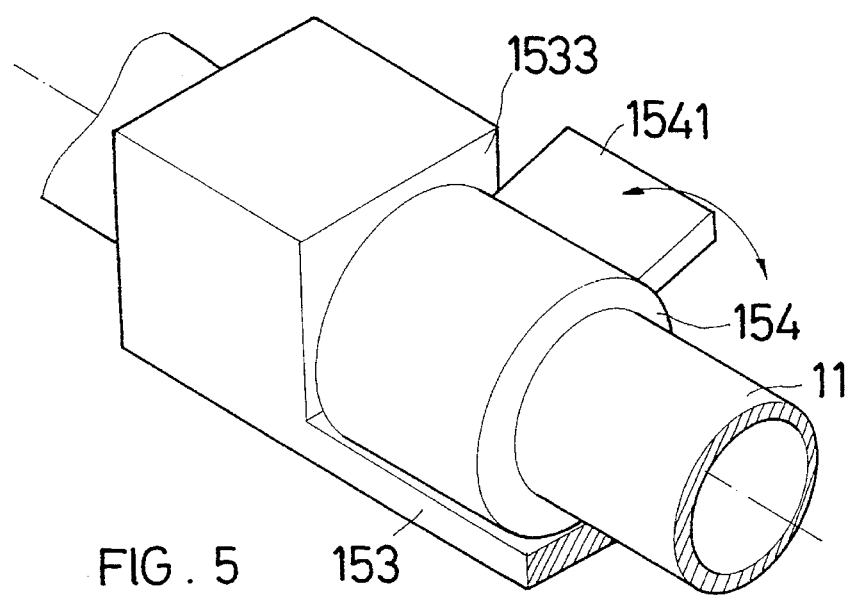
FIG. 5 is an enlarged fragmentary view illustrating how to lock the slider in position.
Figure 6:
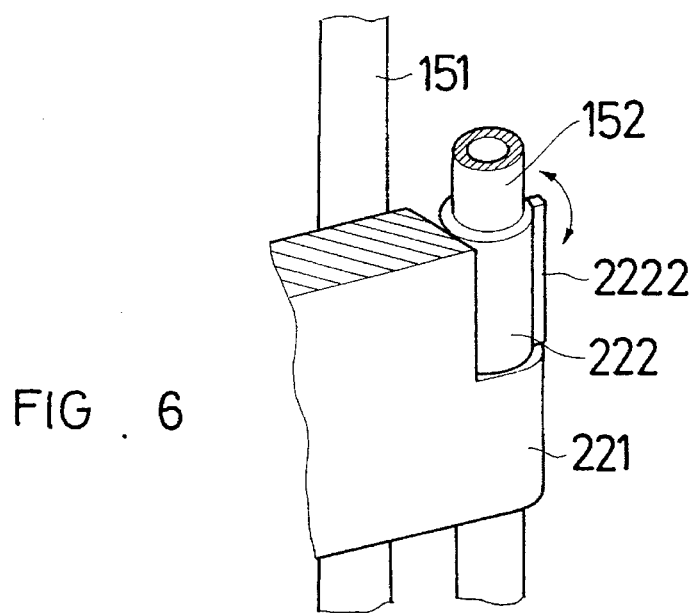
FIG. 6 is an enlarged fragmentary view illustrating how to lock the panel in position.
Figure 7:
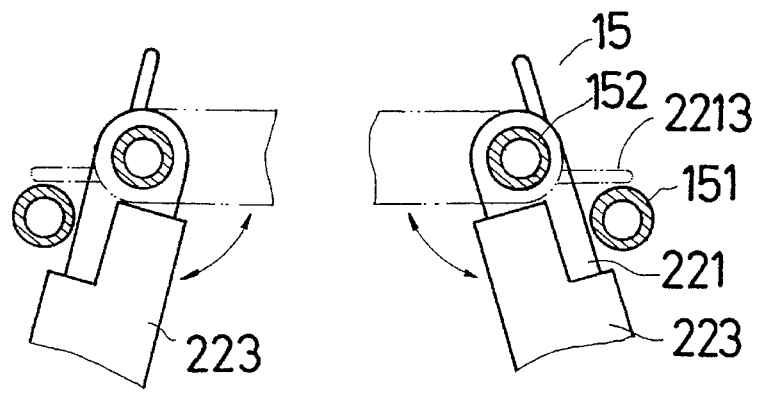
FIG. 7 illustrates how the panel is rotated.
Figure 8:
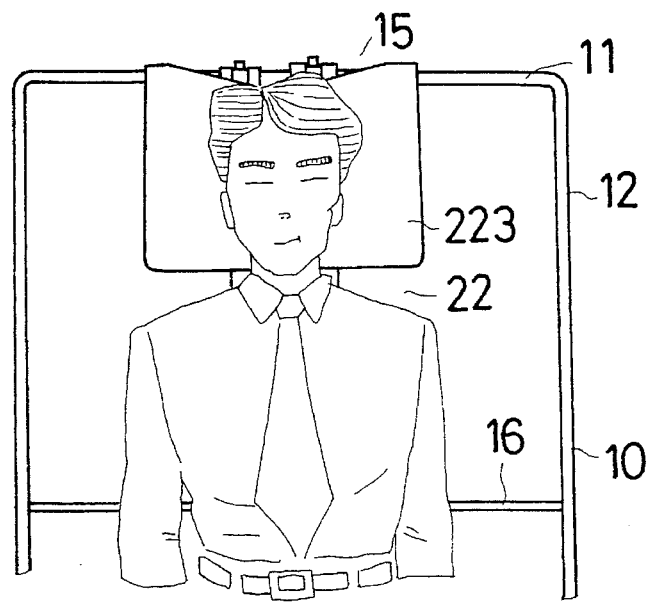
FIGS. 8 and 9 are working views of the present invention.
Figure 9:
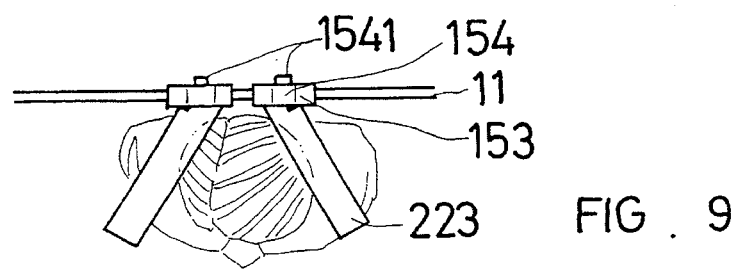
Figure 10:
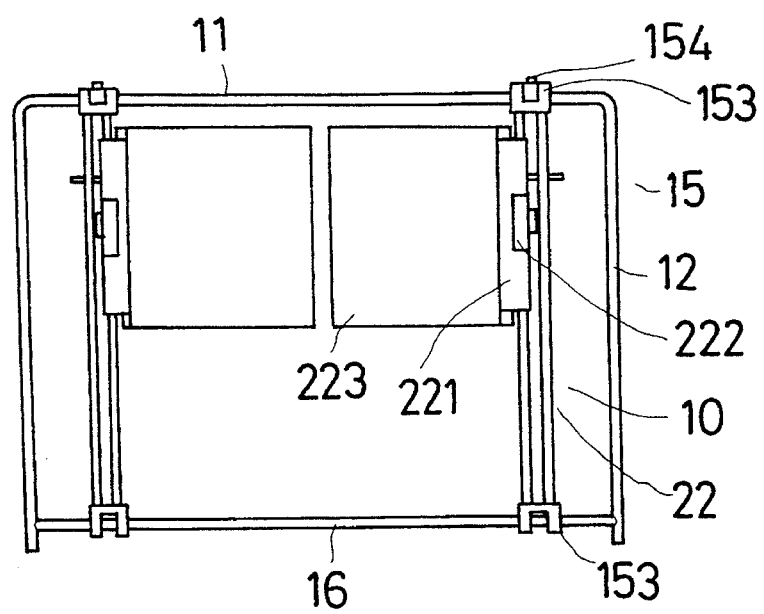
FIG. 10 illustrates how the panels are collapsed when not in use.

With reference to the drawings and in particular to FIGS. 3 and 4 thereof, the headrest according to the present invention mainly comprises two vertical rods 12, an upper horizontal rod 11 connected between the upper ends of the two vertical rods 12, and a lower horizontal rod 16 connected between the two vertical rods 12 and located under the upper horizontal rod 11. Between the upper horizontal rod 11 and the lower horizontal rod 16 there are mounted two vertical supporting means 15. The vertical supporting means 15 includes a positioning rod 151 and a guiding rod 152. Two sliders 135 are fitted on the upper horizontal rod 11 and the lower horizontal rod 11, respectively. The slider 135 is formed with two shoulders between which there is a recess 1533. Each shoulder has a through hole 1531 for the passage of the upper horizontal rod 16. The bottom of the slider 135 has two pins 1532 respectively engaged with the upper ends of the positioning rod 151 and the guiding rod 152. A cylindrical member 154 having an eccentric hole 1542 for receiving the upper horizontal rod 11 is fitted in the recess 1533 of the slider 135 (see FIG. 5). The cylindrical member 154 is formed with a lug 1541 thereon. Each of the guiding rod 152 is provided with a resting seat 22 at the upper end. The resting seat 22 includes a panel 221 having a cavity 2211 and a cylinder 222 fitted in the cavity 2211. The panel 221 has a through hole 2212 at one side for the passage of the guiding rod 152. Furthermore, the panel 221 is provided with a projection plate 2213. The cylinder 222 is formed with an eccentric hole 2221 and a protuberance 2222 on its outer surface (see FIG. 6). Each of the panel 221 is enclosed with a cushion 223 made of soft material. The cushion 223 has an opening 2231 at one side so that the cushion 223 can be easily put over the panel 221. Accordingly, the resting seat 22 can be moved along the upper horizontal rod 11 to a desired position. As shown in FIG. 5, the lug 1541 can be moved to rotate the cylindrical member 154 to lock the slider 153 on the upper horizontal rod 11 or release the slider 153 therefrom. Hence, the resting seats 22 can be adjusted in horizontal position as desired. Similarly, the protuberance 2222 can be turned to rotate the cylinder 222 to lock the panel 221 in place or release the cylinder 222 therefrom (see FIG. 6), thereby enabling the resting seat 22 to be adjusted in vertical position as desired. As the panel 221 is located at an inner side of the engaging rod 151 (see FIG. 7), the panel 221 may be kept at a predetermined angular position as shown in FIGS. 8 and 9. When not in use, the panels 221 may be rotated inward as shown in FIG. 10.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A headrest comprising:

two vertical rods;

an upper horizontal rod connected between upper ends of said two vertical rods;

a lower horizontal rod connected between lower ends of said two vertical rods;

a pair of vertical supporting means arranged between said upper and lower horizontal rods and including a positioning rod and a guiding rod;

a first pair of sliders slidably mounted on said upper horizontal rod and having a recess at an intermediate portion and two pins at a bottom thereof adapted to engage with upper ends of said positioning rod and guiding rod;

a second pair of sliders slidably mounted on said lower horizontal rod and having a recess at an intermediate portion and two pins at a bottom thereof adapted to engage with lower ends of said positioning rod and guiding rod;

a first pair of cylindrical members each fitted in said recess of said first pair of sliders and having a lug and an eccentric hole receiving said upper horizontal rod;

a second pair of cylindrical members each fitted in said recess of said second pair of sliders and having a lug and an eccentric hole receiving said lower horizontal rod;

a pair of panels each slidably mounted on said guiding rod and having a cavity and a projection plate; and a pair of cylinders each fitted in said cavity and having an eccentric hole receiving said guiding rod.

2. The headrest as claimed in claim 1, further comprising a pair of cushions enclosing respective panels.

* * * * *